Sept. 12, 1967   H. J. CARLSON ET AL   3,341,241
DOOR LATCHING ARRANGEMENT
Filed Aug. 10, 1964   2 Sheets-Sheet 1

INVENTORS
Harold J. Carlson
Richard H. Stinnett
BY
Atty.

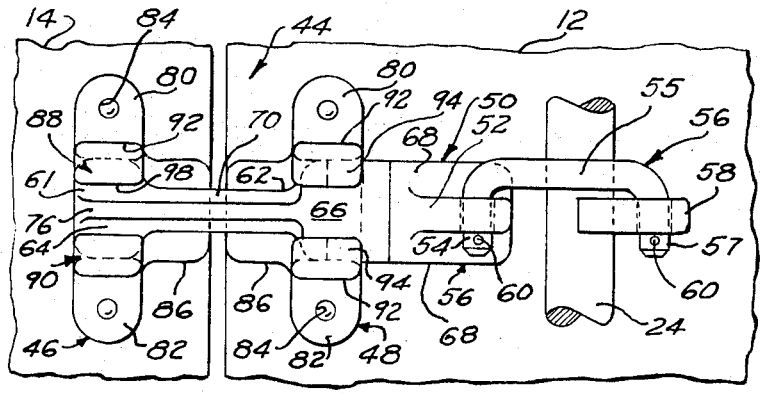
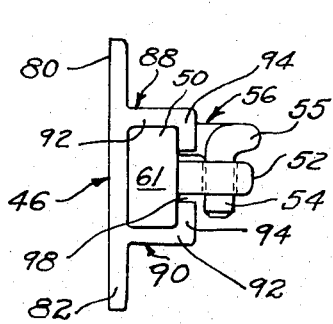
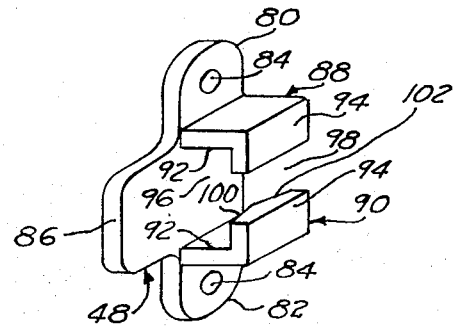
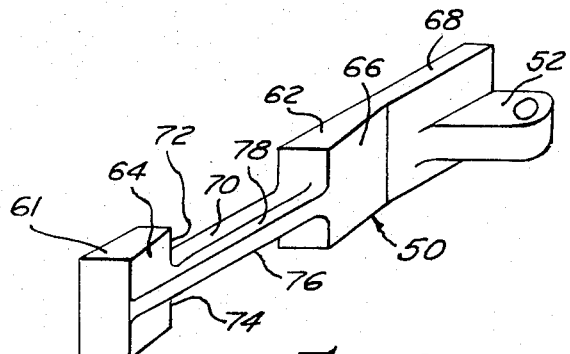

United States Patent Office 3,341,241
Patented Sept. 12, 1967

3,341,241
DOOR LATCHING ARRANGEMENT
Harold J. Carlson, Lakeside, Mich., and Richard H. Stinnett, Chicago, Ill., assignors to W. H. Miner, Inc., Chicago, Ill., a corporation of Delaware
Filed Aug. 10, 1964, Ser. No. 388,366
6 Claims. (Cl. 292—340)

This invention relates in general to door latching mechanisms for large containers carrying heavy cargo such as truck trailers.

Truck trailer doors are generally locked or latched in their closed position by rotation of a bar carrying top and bottom crank arms for engagement with respective keepers. If a center lock is provided usually a separate operation is necessary for either locking or unlocking said center lock. Thus, while a center lock is desirable for more rigidly fastening the two doors to aid in preventing relative movement therebetween in response to cargo shifting during motion, it is sometimes inconvenient to utilize such an arrangement.

The present invention therefore has as one object an improved latching arrangement for containers such as truck trailers.

The invention has for a second object the provision of a three-point latching arrangement for use on truck trailer doors in which the rotation of a latch control bar simultaneously operates both upper and lower crank arms and a center bolt for either locking or unlocking the doors.

It is another object of the present invention to provide a three-point latching arrangement for truck trailers and the like wherein the rotation of a bar carried by one door serves to control top and bottom latches together with a center latch which is disengaged from the keeper on the other door by simply pulling on the one door.

It is yet another object of this invention to provide an improved door latching arrangement for truck trailers in which the doors when locked are rigidified against relative movement.

It is still another object of the present invention to provide a lock arrangement for truck trailers and the like of simple and economical manufacture which may be simply positioned and mounted on the trailer doors for use with conventional and already existing lock arrangements.

Briefly, the objects of the present invention are accomplished by the provision of a bolt element which is moved longitudinally in response to rotation of the conventional lock control bar carried by one door of the trailer for rigidly interconnecting keepers carried by the respective doors. Both keepers are identical and carry wedge faces for engagement with similar spaced apart wedge faces on the bolt element to rigidify the doors when locked. The portion of the bolt element interconnecting the wedge faces on the bolt is aligned with the keeper on the other door in response to rotation of the bar in the unlocking direction and is formed so that the bolt may be simply disengaged from that keeper by swinging the door carrying the bar to its open position. In the case of a single door arrangement the keeper normally mounted on the second door would be mounted on the trailer body instead.

Other objects and features of this invention will become apparent on examination of the following specification, claims and drawings, wherein:

FIG. 3 is a front elevational view of the center latch assembly as shown in FIG. 2;

FIG. 4 is a left end view of the center latch assembly as shown in FIGS. 2 and 3;

FIG. 5 is a perspective end view of one of the center latch keepers; and

FIG. 6 is a perspective end view of the center bolt element.

Figure 1:
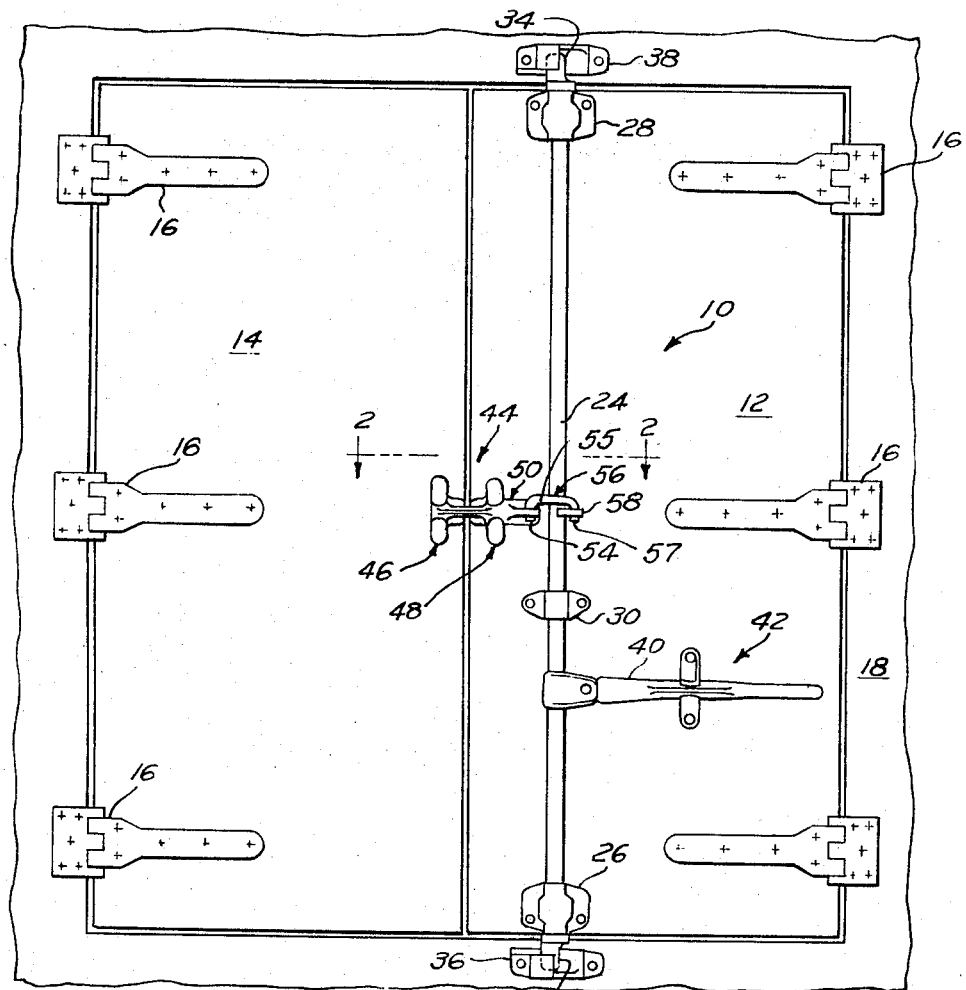
FIG. 1 is a general elevational view of a three-point lock arrangement embodying the invention disposed upon truck trailer doors.

Referring now to FIG. 1 of the drawings, a lock arrangement is indicated generally by the reference character 10. The lock or latch arrangement 10 is utilized for locking a pair of truck trailer doors 12 and 14 or the doors of other suitable containers. The doors 12 and 14 are supported by hinges 16 on the truck trailer body 18 for rotation in opposite directions from closed to open positions and vice versa. When the doors are closed they meet along their vertical edges with an overlap portion 20 on door 12 nesting in a recessed portion 22 of door 14. Therefore, if door 12 is locked shut after door 14 is closed, it will normally maintain door 14 in its closed position.

The door 12 may be locked shut by the locking arrangement 10 which comprises a vertically arranged tube or bar 24 journalled at its opposite ends for rotation in brackets 26 and 28. A bracket 30 also supports the bar 24 between the brackets 26 and 28. Crank arms 32 and 34 extending from respective ends of the bar 24 are adapted to lock the door 12 shut when the crank arms are rotated into engagement with respective keepers 36 and 38. The keepers 36 and 38 are mounted on the truck trailer body and when the crank arms 32 and 34 are disengaged from the keepers the doors may be opened.

A handle 40 fixed to the bar 24 permits facile rotation of the bar for either locking or unlocking the door 12 by rotation of the crank arms. By simply pulling on the handle after door 12 has been unlocked, the door 12 may be swung into its open position about hinges 16. In order to close the door, the procedure is simply repeated in reverse order and when the handle 40 is rotated to latch the doors it is held in that position by a latch assembly 42.

The immediately preceding description has covered a largely conventional truck trailer door lock arrangement which suffers from certain shortcomings. These shortcomings arise from the fact that the doors, whether a single door or double doors, are subject to considerable buffeting when the trailer is in movement and tend to shift unless locked rigidly. For this purpose a novel central latch assembly 44 is incorporated into the conventional portion of the latch assembly 10 for operation therewith.

Figure 2:
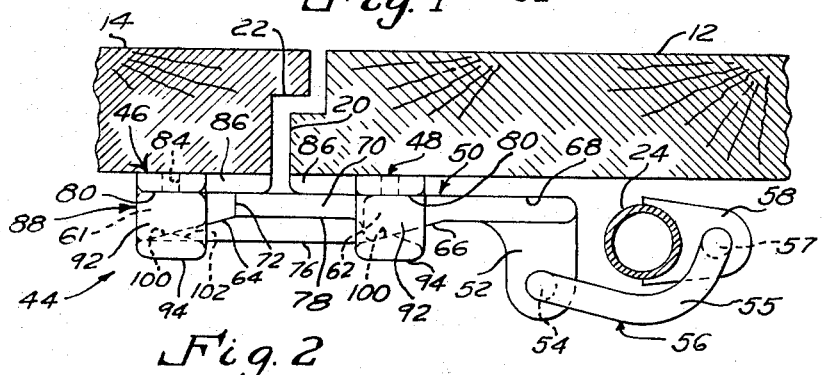
FIG. 2 is a horizontal section taken along the line 2—2 in FIG. 1 and illustrating the top plan view of the center latch assembly in its latched condition.

The latch assembly 44 comprises a keeper 46 mounted on the door 14, a keeper 48 mounted on the door 12, and a bolt element 50. The bolt element 50 has an outwardly projecting ear 52. One leg 54 of a U-shaped link or pin 56 is rotatably mounted in the ear 52 and the other leg 57 of the pin is rotatably mounted in a radially projecting flange element 58 that is fixedly mounted on the bar 24. The connecting or cross member 55 of the pin 56 is given an arcuate or bent configuration as seen in FIG. 2 so that it may pass around the bar 24 as best shown in FIG. 2. Suitable apertures 60 are provided in the legs 54 and 57 of the pin 56 to permit the insertion of fastening elements such as cotter pins to retain the pin 56 in position. With the just described arrangement rotation of the bar 24 is translated through the pin 56 into longitudinal movement of the bolt element 50.

The bolt element 50 comprises generally parallelepiped sections 61 and 62 each having an oblique or wedge face 64 and 66, respectively, sloping outwardly to the left as seen in FIGS. 2 and 6. The section 62 has extending therefrom an elongate portion 68 upon which the ear 52 is carried. The two sections 61 and 62 are integrally connected by an intermediate section 70. The intermediate section 70 has its top and bottom walls recessed or cut away to form passageways 72 and 74. The section 70 is substantially the same width as the sections 61 and 62 and is provided with an integrally formed central rib 76 along its front face 78. The rib 76 extends from the section 62 across the oblique face 64 of section 61.

The keepers 46 and 48 are identical and as seen for keeper 48 in FIG. 5 each comprises an upwardly projecting ear 80 and a downwardly projecting ear 82 each having an aperture 84 to permit the keepers to be fastened to the door. A laterally projecting flange wall 86 is also provided. The outer edges of the flange walls 86 are aligned with the vertical edges of the doors when mounting the keepers as seen in FIG. 2 whereby to properly locate and space the keepers on the doors.

In addition, each keeper 46 and 48 is provided with a pair of outwardly projecting vertically spaced L-shaped lugs 88 and 90 with each lug having a horizontal leg 92 and a vertical leg 94. The spacing between the horizontal legs 92 forms a passageway 96 in which the bolt element 50 is snugly received.

The vertical legs 94 on the lugs 88 and 90 project toward each other but terminate before meeting to form a passageway 98 for enabling the passage of the section 70 therethrough as will be explained. The legs 94 are also provided with oppositely sloping wedge faces 100 and 102 on their inner surfaces for wedging engagement with either face 64 and 66 as will be explained.

In assembling the central latch assembly 44 the keepers 46 and 48 may be easily positioned for mounting on the doors by simply aligning the outer edges of the flange wall 86 on each keeper with the respective vertical edges of the doors 12 and 14. The keepers will therefore be inverted with respect to each other, but since the lugs 88 and 90 are mirror images of each other, this will be of no importance insofar as the bolt element 50 is concerned. In addition, this mounting arrangement serves to properly position the keepers with respect to the bolt element to be assembled thereto. The narrow section 70 of the bolt element 50 is then moved through passageway 98 between legs 94 on keeper 46. The legs 94, therefore, are received in the respective passageways 72 and 74 defined by the section 70 when the bolt element is initially assembled thereto.

When the section 70 is seated in passageway 96 and the doors closed, the bolt element 50 is moved to the right (as viewed in the drawings) to move the elongate portion 68 through the passageway 96 in keeper 48 while the ear 52 passes through the passageway 98 between the legs 94 on the keeper 48. The pin 56 is then connectably mounted between the ear 52 and the flange 58 and secured in position by suitable cotter pins as described herein. Rotation of the bar 24 counterclockwise by handle 40 will now move the bolt element 50 to the right to wedge the faces 64 and 66 firmly against the faces 100 on keepers 46 and 48 for firmly locking the doors 12 and 14 together.

To open the doors, the handle 40 is rotated clockwise to rotate the bar 24 in the same direction thereby translating bolt element 50 to the left until section 70 is aligned with the passageway 98 of keeper 46. At that time the crank arms 32 and 34 are disengaged from the keepers 36 and 38, respectively, and a pulling force on handle 40 rotates door 12 about the hinges 16. The section 70 simply moves through the passageway 98 to disengage door 12 from door 14 and thereby access is provided to the interior of the body 18.

To latch the doors the procedure is simply reversed. Thus, door 14 is first closed and then door 12 is closed with section 70 of the bolt element 50 moving through passageway 98 in keeper 46 until it is seated in passageway 96. The keeper 48 serves to maintain the bolt element 50 properly aligned with passageway 98. The handle 40 is then rotated to translate bolt element 50 to the right to firmly wedge faces 64 and 66 against faces 100 for rigidly securing the doors together. It will be noted that the handle provides a mechanical advantage in moving the wedge faces against each other and that the thrust serves to force the doors more firmly closed with the overlap portion 20 forced tightly against door 14.

In practice, the three-point latch assembly described herein may be used with either the two door arrangement described or in an obvious manner with a single door. The inventive concepts in the foregoing description of an improved truck trailer latch assembly are believed to be more adequately set forth in the accompanying claims.

What is claimed as new is:

1. A pair of identical keepers adapted to be mounted on respective doors of a truck trailer for use in the latch assembly for said doors, the improvement comprising a passageway in each keeper for receiving a linearly movable bolt element, each of said passageways being formed by a pair of L-shaped lugs arranged with one leg of each lug parallel to the corresponding leg on the other lug and with the other leg of each lug extending toward each other and terminating in spaced relationship to each other, and a pair of inclined wedge faces in each passageway formed on corresponding surfaces of said other legs of each lug with each pair of said faces intersecting at the center of the respective leg and sloping away from said passageway, a correspondingly inclined set of said wedge faces in said passageways being engageable, respectively, with a set of complementary inclined wedge faces on said bolt element.

2. A pair of identical keepers adapted to be mounted on respective doors of a truck trailer for use in the latch assembly for said doors, the improvement comprising a passageway in each keeper for receiving a linearly movable bolt element, and an inclined wedge face in each passageway for engagement, respectively, with a pair of complementary inclined wedge faces on said bolt element, each of said keepers being provided with a projecting flange for alignment with the edge of the respective door to permit each keeper to be properly located when mounted on the respective doors.

3. A pair of identical keepers adapted to be mounted on respective doors of a truck trailer for use in the latch assembly for said doors, the improvement comprising a first passageway in each keeper for receiving a linearly movable bolt element, an inclined wedge face in each passageway for engagement, respectively, with a pair of complementary inclined wedge faces on said bolt element, and a second passageway in each of said keepers to permit said bolt element to be disengaged from either of said keepers upon movement thereof transverse to said first passageway.

4. A latch assembly for use in latching the doors of a truck trailer wherein one door has a rotatable bar vertically mounted thereon with crank arms at opposite ends for engaging respective keepers carried by said truck trailer and wherein said one door is adapted to engage the other door along a vertically disposed edge when both said doors are closed, the improvement comprising a bolt element hingedly connected to said bar for longitudinal movement across said edge in response to rotation of said bar, a pair of keepers each mounted on a respective one of said doors, a first passageway in each keeper in which said bolt element is received and permitting said bolt element to move longitudinally in opposite directions therethrough in response to rotation of said bar in opposite directions, a pair of spaced apart wedge faces on said bolt element and a wedge face in each passageway for engaging said spaced apart wedge faces to rigidly secure said doors together in response to the movement of said bolt element in one direction, a second passageway in the keeper on said other door with said second passageway being aligned transverse to said first passageway, a section of said bolt element interconnecting the wedge faces on said bolt element being aligned with said second passageway on movement of said bolt in the opposite direction to permit said one door to be rotated from its closed position with said interconnecting section of said bolt element moving through said second passageway.

5. In the latch assembly claimed in claim 4, a spacing flange on each of said keepers for alignment with respective door edges to permit said keepers to be properly positioned when mounted on said doors.

6. A latch assembly for use in latching the doors of a container adapted to carry heavy cargo wherein one door has a rotatable bar vertically mounted thereon with crank arms at opposite ends for engaging respective keepers carried by said container, and wherein said one door is adapted to engage the other door along a vertically disposed edge when both said doors are closed, the improvement comprising a bolt element, a U-shaped pin operably connected between said bar and said bolt element for longitudinally moving said bolt element across said edge in response to rotation of said bar, a first pair of keepers each mounted on a respective one of said doors, a passageway in each keeper in which said bolt element is received and permitting said bolt element to move longitudinally in opposite directions therethrough in response to rotation of said bar in opposite directions, a pair of spaced apart wedge faces on said bolt element and a wedge face in each passageway for engaging said spaced apart wedge faces to rigidly secure said doors together in response to movement of said bolt element in one direction, a second passageway in the keeper on said other door with said second passageway being aligned transversely to said first passageway, a section on said bolt element between the wedge faces thereon adapted to be aligned with said second passageway upon movement of said bolt element in the opposite direction to permit said one door to be rotated from its closed position with said latter section of said bolt element moving through said second passageway.

References Cited

UNITED STATES PATENTS

| | | | |
|---|---|---|---|
| 497,445 | 5/1893 | Durland | 292—139 |
| 853,358 | 5/1907 | Hammar et al. | 292—162 |
| 1,720,173 | 7/1929 | Fuchs | 292—2 |
| 2,337,948 | 12/1943 | Vani | 292—7 X |
| 2,451,537 | 10/1948 | Dath | 292—218 |
| 3,147,031 | 9/1964 | Olander | 292—340 |

FOREIGN PATENTS

| | | |
|---|---|---|
| 182,334 | 6/1955 | Austria. |
| 119,133 | 6/1947 | Sweden. |

MARVIN A. CHAMPION, *Primary Examiner.*

EDWARD C. ALLEN, *Examiner.*

J. R. MOSES, *Assistant Examiner.*